Patented Oct. 10, 1939

2,175,585

UNITED STATES PATENT OFFICE 2,175,585

PREPARATION OF FURFURYLAMINES

Homer Adkins, Madison, Wis., and Charles F. Winans, Akron, Ohio

No Drawing. Application April 14, 1936, Serial No. 74,342

10 Claims. (Cl. 260—345)

This invention relates to the catalytic synthesis of furfuryl secondary and tertiary amines. More particularly, it relates to a process for the catalytic synthesis of furfuryl-amines by the hydrogenation of reaction products of furfural and amines. It includes the products of the process.

By the discoveries of this invention, furfuryl secondary and tertiary amines of high purity may be prepared quickly, efficiently and in excellent yields. Of the starting materials, the furfural may be either the alpha or beta isomer. Since alpha furfural, however, is more commonly found in commerce, it will be understood that the use of alpha furfural is preferred in the practice of the invention. Of the amine starting materials, any primary or secondary amine may be used. The pressures found preferable will in general range from 50 to 150 atmospheres, although much lower pressures, as low as 5 atmospheres, may be used in some instances. In such cases the time of reaction will be somewhat longer and it will be found desirable in most cases to use a pressure in the stated preferred range. Higher pressures than 150 atmospheres may be employed if the apparatus in which the process is carried out is sufficiently strong, although generally there will be no object in employing such higher pressures.

A superatmospheric temperature should also be used but, where carefully purified furfural is used, it should preferably not be permitted to rise above about 110° C. for any great period of time during the reaction, for the reason that above about 110° C. the furane ring is reduced to the tetrahydro furane ring, thereby producing tetrahydro furfuryl amines rather than the furfuryl amines of the invention. The preferred range is from 50 to 110° C. although it will be understood that in some cases temperatures as low as 25° may be used. If the furfural is not carefully purified to remove sulphur compounds before use, temperatures of about 25–50° C. higher than those stated may be necessary and will not cause reduction of the furane ring.

The furfural and the amine may be mixed just prior to hydrogenation or they may be first reacted and the product isolated, this product then being hydrogenated. It is generally preferable in the case of furfural-primary amines first to isolate the product, thereby separating the water formed which, if not eliminated or provided for, will cause the catalyst to cake in the subsequent hydrogenation step and thus reduce the efficiency of the process. If the furfural-primary amine product is not isolated prior to the hydrogenation step, it is preferable to employ a mutual solvent, such as alcohol or dioxane, in which both the Schiff base and the water formed are soluble. In those cases where secondary amines are employed, their reaction products with furfural are usually so unstable that it is desirable to hydrogenate the mixture of amine and furfural directly, preferably in a water miscible solvent. It is, of course, to be understood that with both primary and secondary amines either mixtures or isolated reaction products with furfural may be used in the practice of the invention. Also, in any event where the reaction product is a solid at ordinary temperatures or where the amine in the mixture is a solid, it is preferable to employ a solvent, which as stated, should be miscible with water.

Although any of the ordinary hydrogenation catalysts is applicable for use in the invention, it has been found that the nickel catalyst prepared by the treatment of a nickel alloy, such as nickel-aluminum, or nickel-silicon, with aqueous alkalis, as described in United States Patent No. 1,628,190 to Raney, is particularly suitable. Another nickel catalyst which may be employed with excellent results is the supported nickel catalyst described in Adkins application Serial No. 616,093, filed June 8, 1932, now matured into Patent No. 2,040,233, and prepared by mixing an aqueous solution of a nickel salt and a foraminous carrier, preferably acid-washed kieselguhr, and thereafter grinding the carrier-nickel salt mixture until it is of a cream-like consistency. Following this, a carbonate precipitant which reacts basic to litmus paper, preferably an aqueous solution of an ammonium or alkali metal carbonate, such as ammonium carbonate, sodium carbonate or sodium bicarbonate, is added to the mixture, maintained during the addition of carbonate at a temperature of 70–80° C. After washing and drying, the resulting precipitated nickel carbonate is reduced in a stream of hydrogen or other reducing gas for approximately 60–80 minutes at 425–475° C., the finished catalyst containing 15±2% nickel. Other catalyst prepared in a similar manner may also be used, examples being those of copper and cobalt.

Platinum and other noble metal catalysts may be employed with very good results, but because of the lower cost of the base metal hydrogenation catalysts, the latter will generally be found more desirable.

Nickel catalysts prepared by other methods, such as the following, may also be used in the practice of the invention: (1) the reduction of nickel oxides, silicates, carbonates and bicarbonates, either supported or unsupported, by hydrogen or other reducing agent; (2) the reduction of nickel oxides, silicates, carbonates and bicarbonates in admixture with salts of other metals of Group VIII or I of Mendelejeff's Periodic Table, the reduced salts acting as co-catalysts; (3) the reduction of nickel oxides, silicates, carbonates and bicarbonates mixed with promoters such as oxides of the metals of Group II, III, IV, V and VI of Mendelejeff's Periodic Table; (4) anodic oxidation of nickel surfaces followed by reduction; (5) precipitation by more electropositive metals such as aluminum and zinc. The catalyst used should, of course, be active at a temperature below the decomposition temperature of the furfural-amine compound.

As illustrative of the invention, but not limitative thereof, the following examples are given:

Example 1

1.65 mols of furfural-n-butyl amine, a liquid boiling at 110–115° C. at 32 mm. pressure, were hydrogenated in the presence of about 10 grams of a Raney nickel catalyst prepared by the treatment of a nickel aluminum alloy with an aqueous alkali, as described in U. S. Patent No. 1,628,190. Hydrogen was absorbed, the pressure ranging from 100 to 150 atmospheres. The time of reaction until sufficient hydrogen was absorbed to saturate the carbon to nitrogen double link was 3½ hours, the temperature rising to a maximum of 110° C. during this period and being maintained at this figure for approximately two hours. The product, upon fractional distillation, gave a 75% yield of furfuryl-N-butyl amine, boiling point 92–100° C. at 30 mm. pressure.

Example 2

1.4 mols of furfural-benzyl amine, a liquid boiling at 129–131° C. at 2 mm., and about 10 grams of a Raney nickel catalyst were placed in a copper liner and enclosed in a hydrogenation bomb. The mixture was submitted to agitation and hydrogen was then introduced to a pressure of 100 atmospheres in a bomb and the contents heated to 85° C. in a period of approximately 20 minutes. The temperature was maintained at this figure for a period of approximately 70 minutes at which time the absorption of hydrogen was stopped and corresponded to the formation of furfuryl benzyl amine. Upon fractional distillation of the product, a 91% yield of furfuryl benzyl amine, boiling point 118–120° C. at 2 mm. pressure, was obtained. The benzoyl derivative of this product melted at 71–72° C. and was found to contain an average nitrogen analysis of 4.81% as compared with the calculated nitrogen analysis for the benzoyl derivative of furfuryl benzyl amine of 4.83%.

Example 3

0.27 mol of furfural-p-amino phenol, a solid melting at 187–187.5° C., was dissolved in ethanol and in the presence of about 5 grams of a Raney nickel catalyst was subjected to a hydrogen pressure of approximately 100–150 atmospheres for a period of one hour at a maximum temperature of 75° C. The reduction of the carbon to nitrogen double linkage was practically quantitative, a 99% yield of furfuryl-p-amino phenol, melting point 108–110° C., being obtained. The product upon analysis was found to contain 7.35% nitrogen as compared with the theoretical nitrogen content of furfuryl-p-amino phenol of 7.41%.

Example 4

Upon the hydrogenation of an ethanol solution of 0.21 mol of di furfural benzidine, a solid melting at 212–213° C., in the presence of about 5 grams of a Raney nickel catalyst for a period of 3 hours at a maximum temperature of 75° C. and a pressure ranging from 100–150 atmospheres, a 79% yield of N-N'-difurfuryl benzidine, melting point 155.5–156° C. was obtained. An analysis of the product gave 8.35% nitrogen as compared with the theoretical nitrogen content for di furfuryl benzidine of 8.13%.

Example 5

An ethyl alcohol solution of 0.19 mol of di furfural p-phenylene diamine, a solid melting at 164–165° C., and about 5 grams of a Raney nickel catalyst were subjected to a hydrogen pressure of 100–150 atmospheres for a period of one hour at a maximum temperature of 75° C. Upon separation of the product, a 90% yield of N-N'-di furfuryl-p-phenylene diamine, melting point 75–77° C., was obtained. This product was found to contain 10.35% nitrogen as compared with the theoretical nitrogen content for di furfuryl-p-phenylene diamine of 10.45%.

Example 6

A mixture of 100 grams of piperidine and 100 grams of crude furfural in 350 ml. of ethanol evolved much heat. This mixture was hydrogenated under a pressure of 50–100 atmospheres in the presence of 10 grams of a rather inactive Raney nickel catalyst. Absorption of hydrogen commenced immediately at the temperature of 35° C. but did not proceed very fast below 50° C. After a total time of 19 minutes (14 minutes at 50–69° C.) a sufficient amount of hydrogen was absorbed to satisfy the following equation and the run was stopped.

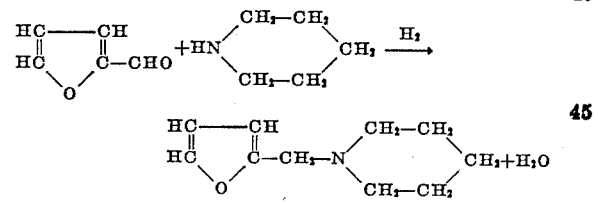

Distillation of the filtered reaction mixture gave the following fractions:

(1) Up to 90° C. @ 30 mm.—Alcohol solvent, etc.
(2) From 90 to 120° C. @ 30 mm. (mostly at 110–120° C. @ 30 mm.)—68.5 grams of N-furfuryl piperidine.
(3) Above 120° C. @ 30 mm.—Black viscous tar.

Fraction 2 was identified as N-furfuryl piperidine by its unreactivity with nitrous acid (characteristic of tertiary amines), and by its formation with picric acid of a crystalline salt melting at 107–108° C. Also, an analysis of this salt for picric acid gave 58.2% as compared with the theoretical figure of 58.1% for the picric acid salt of N-furfuryl piperidine. The rather low yield of N-furfuryl piperidine may be ascribed in part at least to the crude furfural employed.

From these illustrative examples it is apparent that the invention provides a novel class of compounds as well as an efficient process for preparing them. In each of the examples the furfural employed was freshly distilled and of a high degree of purity. While Example 1 required a longer time and a higher temperature than is usually necessary in the practice of the invention, this was caused by chloride impurities in the butylamine, which reduced the activity of the catalyst. While the examples have described the preparation principally of furfuryl secondary amines, which are the preferred class of the compounds of the invention, it will be understood that tertiary amines may be prepared by the same process merely by substituting a secondary amine for the primary amine starting material. Illustrative of such tertiary amines are the furfuryl amines of morpholine, dicyclohexyl amine, dibenzyl amine, N-ethyl cyclohexylamine, dimethyl amine, N-butyl tetrahydrofurfurylamine, ethyl aniline diamyl amine, dibutyl amine, di-(beta phenyl ethyl) amine, diphenyl amine, sym-dibutyl ethylene diamine, N-isopropyl beta naphthylamine, N-cyclohexyl aniline, diethyl amine, ditetra hydro furfuryl amine, N-ethyl decahydro naphthylamine, etc. Other furfuryl secondary amines of the invention are those prepared by treating furfural in the process of the invention with such amines as ethyl amine, aniline, furfuryl amine, para phenetidine, beta phenethyl amine, ortho toluidine, the alpha and beta primary naphthylamines, tetrahydro furfuryl amine, cyclohexyl amine, heptyl amine, the AR- and AC- tetrahydro primary naphthylamines, o-amino phenol, xylidine, tolidine, ethanol amine, amino pyridine, methyl amine, ethylene diamine, propylamine, isopropylamine, n-amylamine, iso-amylamine, sec. amylamine and the amylene diamines. Other furfuryl secondary amines are those of hexahydro o- and p-anisidine, hexahydro o- and p-toluidine, hexahydro o- and p-phenetidine, and of other alkoxy substituted alicyclic amines. Still others are the furfuryl derivatives of the decahydro naphthylamines, alpha and beta, of the alicyclic amino acids and esters thereof, such as of hexahydro anthranilic acid and of its esters. Other furfuryl amines are those prepared by reducing the products of furfural with the nitro anilines, with the nitro toluidines, with the cumidines, with the chlor phenylamines and with the hydroxy-, alkyl-, carboxylic- and nitro-naphthylamines.

It is readily seen that by this invention a very efficient method of preparing amines by hydrogenation is provided. The reaction may be carried out in the liquid phase under pressure, thereby permitting the use of more compact, efficient and simplified apparatus. It also permits greater ease in accuracy in the manipulation of the ingredients and the final products. By the use of pressures the reactions are driven to completion quickly and efficiently, the necessity for vaporizing the ingredients is overcome and syntheses not heretofore capable of being accomplished are made possible. Also, a novel class of amines is provided. They may be used in the vulcanization of rubber and as intermediates in the preparation of rubber vulcanization accelerators.

This application is, in part, a continuation of application Serial No. 619,732, filed June 28, 1932, now matured into Patent No. 2,058,547.

The various examples hereinbefore set forth are to be understood as illustrative only and not limitative of the scope of the invention. It is intended that the patent shall cover, by suitable expression in the appended claims, all features of patentable novelty inherent in the invention.

What we claim is:

1. The process for preparing furfuryl secondary and tertiary amines which comprises hydrogenating under superatmospheric pressure, at a superatmospheric temperature of not above about 110° C., in the liquid phase and in the presence of a base metal hydrogenation catalyst, a reaction product of furfural and an amine containing the group

wherein at least one of the R groups is hydrocarbon.

2. The process for preparing furfuryl secondary and tertiary amines which comprises hydrogenating in a closed vessel under superatmospheric pressure, at a superatmospheric temperature of not above about 110° C., in the liquid phase and in the presence of a nickel catalyst, a mixture of furfural and a primary amine.

3. The process for preparing furfuryl secondary and tertiary amines which comprises hydrogenating in a closed vessel under superatmospheric pressure, at a superatmospheric temperature of not above about 110° C., in the liquid phase and in the presence of a nickel catalyst, a mixture of furfural and a secondary amine.

4. The process for preparing furfuryl secondary and tertiary amines which comprises hydrogenating in a closed vessel under superatmospheric pressure, at a superatmospheric temperature of from about 25° C. to about 110° C., in the liquid phase and in the presence of a base metal hydrogenation catalyst, a mixture of furfural and a saturated amine containing at least one hydrogen atom attached to an amino nitrogen atom.

5. The process of preparing N-cyclohexyl furfuryl amine which comprises hydrogenating furfural and cyclohexyl amine at a temperature of from about 50° C. to about 110° C., under a superatmospheric pressure, and in the presence of a nickel catalyst.

6. The process of preparing furfuryl p-amino phenol which comprises hydrogenating furfural and p-amino phenol at a temperature of from about 50° C. to about 110° C., under a superatmospheric pressure, and in the presence of a nickel catalyst.

7. The process of preparing N-furfuryl n-butyl amine which comprises hydrogenating furfural and n-butyl amine at a temperature of from about 50° C. to about 110° C., under a superatmospheric pressure, and in the presence of a nickel hydrogenation catalyst.

8. The process for preparing furfuryl secondary and tertiary amines which comprises hydrogenating under superatmospheric pressure, at a superatmospheric temperature of not above about 110° C., in the liquid phase and in the presence of a hydrogenation catalyst selected from the group consisting of nickel and cobalt, furfural and an amine containing at least one hydrogen atom attached to an amino nitrogen atom.

9. The process for preparing furfuryl secondary and tertiary amines which comprises hydrogenating in combination furfural and an amine containing at least one hydrogen atom attached to an amino nitrogen atom, in the liquid phase, in the presence of a hydrogenation catalyst and under superatmospheric conditions of temperature and pressure inducing absorption of hydrogen at the linkage of the furfural with the amine but not causing reduction of the furane ring.

10. N-furfuryl N-(p-hydroxy phenyl) amine.

HOMER ADKINS.
CHARLES F. WINANS.